United States Patent [19]
Fertner

[11] Patent Number: 5,793,801
[45] Date of Patent: Aug. 11, 1998

[54] FREQUENCY DOMAIN SIGNAL RECONSTRUCTION COMPENSATING FOR PHASE ADJUSTMENTS TO A SAMPLING SIGNAL

[75] Inventor: Antoni Fertner, Solna, Sweden

[73] Assignee: Telefonaktiebolaget LM Ericsson, Stockholm, Sweden

[21] Appl. No.: 679,387

[22] Filed: Jul. 9, 1996

[51] Int. Cl.$^6$ ............ H04B 1/40; H04B 1/12; H04L 7/00; H03H 7/40
[52] U.S. Cl. ............ 375/219; 375/233; 375/350; 375/355
[58] Field of Search ............ 375/233, 232, 375/230, 229, 354, 219, 340, 346, 348, 350; 364/724.19, 724.2; 333/28 R, 28 T, 166, 167, 18; 379/406, 410, 411; 348/392, 424, 425

[56] References Cited

U.S. PATENT DOCUMENTS

| | | | |
|---|---|---|---|
| 5,317,596 | 5/1994 | Ho et al. | 375/14 |
| 5,384,806 | 1/1995 | Agazzi et al. | 375/8 |
| 5,555,285 | 9/1996 | Tapia et al. | 379/28 |

FOREIGN PATENT DOCUMENTS 0 454 242  10/1991  European Pat. Off.

OTHER PUBLICATIONS

*IEEE Transactions on Communications*, vol. COM-33, No. 8, Aug. 1985, David D. Falconer, "Timing Jitter Effects on Digital Subscriber Loop Echo Cancellers: Part I—Analysis of the Effect".

*Proc. IEEE* Globecom '87, pp. 1971–1975, A. Kanemasa et al., "Compensation for the Residual Echo Increase Due to a Timing Clock Phase Jump".

*Electronics Letters*, vol. 21, No. 14, Jul. 4, 1985, pp. 585–586, S.A. Cox, "Clock Sensitivity in Long Cancellers".

*Proc. IEEE Int. Symp. Circuit Syst.*, San Diego, CA, May 10–13, 1992, pp. 1717–1720, Oscar E. Agazzi et al., "Two-Phase Decimation and Jitter Compensation in Full-Duplex Data Transceivers".

*IEEE Transactions on Acoustics, Speech, and Signal Processing*, vol. ASSP-31, No. 3, Jun. 1983, pp. 609–615, S. Shankar Narayan et al., "Transform Domain LMS Algorithm".

*IEEE Transactions on Circuits and Systems*, vol. CAS-28, No. 6, Jun. 1981, pp. 524–534, Robert R. Bitmead et al., "Adaptive Frequency Sampling Filters".

*IEEE Transactions on Acoustics, Speech, and Signal Processing*, vol. 37, No. 4, Apr. 1989, pp. 519–533, John J. Shynk, "Adaptive IIR Filtering Using Parallel-Form Realizations".

(List continued on next page.)

Primary Examiner—Chi H. Pham
Assistant Examiner—William Luther
Attorney, Agent, or Firm—Nixon & Vanderhye P.C.

[57] ABSTRACT

In a digital communications system, a sampled signal is precisely reconstructed (rather than approximated) even in situations where the phase of the sampling signal is adjusted. More particularly, the sampled signal is compensated in the frequency domain for phase adjustments to the sampling instance in the time domain. In the context of echo cancellation, an echo transfer function is generated representing the echo channel impulse response. Aliased components present in the echo impulse response are specifically identified and compensated for in the frequency domain by treating each spectral filter coefficient of the echo transfer function as the sum of a baseband component and an aliased component. In addition to accurately compensating for sampling phase adjustments, this technique considerably relaxes traditional sampling constraints.

20 Claims, 8 Drawing Sheets

OTHER PUBLICATIONS

*IEE Proceedings-F*, vol. 139, No. 5, Oct. 1992, pp. 327–335, B. Farhang–Boroujeny et al., "Selection of orthonormal transforms for improving the performance of the transform domain normalised LMS algorithm".

*IEEE Transactions on Signal Processing*, vol. 43, No. 2, Feb. 1995, pp. 422–431, Françoise Beaufays, "Transform–Domain Adaptive Filters: An Analytical Approach".

*IEEE Transactions on Signal Processing*, vol. 42, No. 3, Mar. 1994, pp. 532–538, B. Farhang–Boroujeny et al., "Generalized Sliding FFT and Its Application to Implementation of Block LMS Adaptive Filters".

*IEEE Journal on Selected Areas in Communications*, vol. SAC–4, No. 8, Nov. 1986, pp. 1281–1293, David G. Messerschmitt, "Design Issues in the ISDN U–Interface Transceiver".

*Serving Humanity Through Communications, Supercomm/ICC*, New Orleans, May 1.–5, 1994, vol. 1, No. 1, Mary 1994, Institute of Electrical and Eelctronics Engineers, M. Ho et al., "Timing Recovery for Echo–Cancelled Discrete Multitone Systems".

FREQUENCY DOMAIN SIGNAL RECONSTRUCTION COMPENSATING FOR PHASE ADJUSTMENTS TO A SAMPLING SIGNAL

RELATED APPLICATIONS

This application is related to commonly assigned U.S. patent application Ser. No. 08/502,317, entitled "Method and Apparatus for Timing Recovery" filed on Jul. 13, 1995 now U.S. Pat. No. 6,675,612.

FIELD OF THE INVENTION

The present invention relates to signal reconstruction in sampled digital communication systems, and in one particular example application, to a method and apparatus for frequency domain adaptive echo cancellation that compensates in the frequency domain for sampling phase adjustments made in the time domain as a result of frequency drift, phase jitter, and changes in a communications channel.

BACKGROUND AND SUMMARY OF THE INVENTION

Many communication applications require high immunity against noise, such as high speed data communication devices, that must meet high precision requirements necessary for digital transmission/reception, e.g., a digital 2B1Q transceiver according to the U-interface from the Integrated Services Digital Network (ISDN) standard. In such applications, communications over a digital subscriber line or other communications loop may require a very low or even error free transmission of coded binary data. For example, a bit error rate (BER) equal to or less than $10^{-7}$ is required for use in the ISDN basic access interface for subscriber loops. Such bit error rates are difficult to obtain given unknown delays, attenuation, dispersion, noise, and intersymbol interference (ISI) introduced by and/or on the communications channel. One area where BER must be closely controlled is at the transceiver adaptive echo canceller in duplex digital data transmission systems.

In one example modulation technique used in high speed data communication systems, digital data to be transmitted by a "near end" transceiver modulates the amplitude of a train of identically shaped pulses. The modulated pulses are then transmitted over the communications channel. Some portion of the transmitted signal is reflected back on the communications loop and mixes in with the "far end" signal received by that near end transceiver. The transceiver uses an echo canceller to remove this reflected signal—commonly referred to as "echo." Achieving high accuracy echo cancellation is difficult for a number of reasons.

First, the echo signal cannot be assumed to be exactly the same as the corresponding originally transmitted signal. As is well known, the communications channel has a transfer function defined by its impulse response which modifies signals (typically pulses) traveling over that communications channel. That transfer function also modifies echos. As a result, echo cancellers use digital transversal filters, such as finite impulse response (FIR) filters, to model the communications channel transfer function and process the transmitted signal in accordance with that channel model. There is typically some difference between the channel model and the real world channel that causes some echo to remain uncancelled.

A second complicating problem is that the communications channel changes, and therefore, the model of the communications channel must change. Digital filters are generally implemented using a tap delay line where delayed versions of the transmitted signal are "tapped" at each delay, "weighted" or multiplied by corresponding filter coefficients, and summed. These coefficients are the filter model of the communications channel. To accommodate changes in the communications channel model, such digital filters typically use some type of recursive algorithm to adapt the coefficients to those changes. One of the more commonly used recursive algorithms is the Widrow-Hoff, gradient-based, least mean squared (LMS) algorithm described, for example, in B. Woodrow & S. D. Stearns, *Adaptive Signal Processing*, Prentice-Hall, Inc., Englewood Cliffs, N.J. 1985.

A third complicating factor already mentioned is the extremely low bit error rate required in many communication applications. For example, the $10^{-7}$ bit error rate for ISDN interfaces to subscriber loops does not leave much tolerance, especially when the channel and/or a transceiver parameters change. It's one thing to deliver this low BER most of the time; it's a more challenging task to maintain it all the time through such changes and adjustments.

One such adjustment relates to maintaining synchronization in a digital subscriber loop transmission system. More particularly, the sampling clock of a receiving transceiver must be continually adjusted to account for a number of factors to ensure accurate, synchronized operation including: (1) setting the instant when received signals are sampled at the optimal or near optimal sampling point, (2) tracking and compensating for frequency drift between the timing oscillators located in both the receiving transceiver and in the transmitting transceiver for a particular communication; and (3) tracking and compensating for changes in the transmission media, i.e., the communications channel. A great challenge in this technological arena is that of maintaining this incredibly low level of noise/BER when the sampling phase of the receiving transceiver is changed for any of the above reasons.

Thus, a problem the present invention addresses is how to compensate an echo canceller to ensure that the echo received at the moment of transceiver clock phase adjustment is precisely cancelled to avoid a momentary increase of uncancelled echo and therefore bit error rate. Otherwise, that phase adjustment introduces a significant risk of erroneous symbol detection because of the momentary increase of imperfectly cancelled echo.

A number of methods have been proposed for avoiding reduced echo cancellation as a result of echo canceller misadjustment including those described in the following papers: D. Falconer, "Timing Jitter Effects on Digital Subscriber Loop Echo Cancellers: Part I—Analysis of the Effect," *IEEE Trans. Commun.*, vol. COM-33, no. 8, August 1988, pp. 826–832; D. G. Messerschmitt, "Design Issues in the ISDN U-Interface Transceiver," *IEEE J Select. Areas Commun.*, vol. SAC-4, no. 8, November 1986, pp. 1281–1293; A. Kanemasa et al., "Compensation for the Residual Echo Increase due to a Timing Clock Phase Jump," *Proc. IEEE Globecom '87*, pp. 1971–1975; S. A. Cox, "Clock Sensitivity Reduction in Echo Cancellers," *Elect. Lett.*, vol. 21, no. 14, July 1985, pp. 585–586; O. E. Agazzi et al., "Two-phase Decimation and Jitter Compensation in Full-Duplex Data Transceivers," *Proc. IEEE Int. Symp. Circuit Syst.*, San Diego, Calif., May 10–13, 1992, pp. 1717–1720.

Unfortunately, such proposed techniques suffer a number of limitations and do not adequately compensate the echo canceller during phase adjustments to maintain the required accuracy. These techniques, for example, assume that the sampling rate exceeds the Nyquist rate. In other words, a general assumption is made that the sampled echo in the received signal does not contain frequencies greater than one-half the frequency at which the received signal is actually sampled. If that assumption is correct, the echo signal and the echo impulse response can in theory be reconstructed in the time domain. However, practical signal reconstruction approaches in the time domain employ approximation methods, such as a first order approximation corresponding to linear interpolation, to simplify implementation. With an approximate interpolation technique, predicted values of the echo canceller adaptive filter coefficients, (i.e., the coefficient values after sampling phase adjustment), are calculated just before the phase adjustment occurs. When the phase adjustment does occur, the adaptive filter coefficients are set to the predicted values. However, despite the goal of simplifying, approximations in the time domain are complicated to implement in real life applications. Moreover, approximations are just that— approximations. An approximate model of an echo typically does not cancel an actually received echo within the very low BER requirements described above, especially when sampling phase adjustments or other changes occur.

The other major drawback with these approaches is that the Nyquist requirement is often not satisfied. The typical sampling rate in real world digital communication systems is set at or near the minimum possible rate, i.e., at the symbol transmission rate, since complexity and cost increase with the sampling rate. This means that the received signal often is not sampled fast enough with the result that it can not be perfectly reconstructed. As a result, higher frequency signal components that exceed half of the sampling rate in the received signal are aliased to low frequency components directly in the baseband frequency of the signal of interest.

FIGS. 1(A) and 1(B) illustrate this aliasing effect which is sometimes referred to as foldover distortion. Given that $f_s$ is the sampling frequency and BW is the bandwidth of the input signal, if $f_s$ is greater than 2 BW, the resulting spectrum of a pulse amplitude modulation (PAM) pulse train, for example, can be recovered by simply low pass filtering the separated PAM signal spectrum with an output filter. However, if the original input waveform is undersampled, i.e., $f_s<2$ BW, output distortion occurs because the frequency spectrum centered about the sampling frequency overlaps the original spectrum and cannot be separated from the original spectrum by filtering as shown in FIG. 1(A). Since it is a duplicate of the input spectrum "folded back" on top of the desired spectrum that causes this distortion, it is called "foldover" or "aliasing" since there are now frequency components in the desired frequency band that did not exist in the original waveform. FIG. 1(B) illustrates an aliasing process occurring in speech if a 5.5 kHz signal is sampled at an 8 kHz rate. The sampled values are identical to those obtained from a 2.5 kHz input signal. After the sampled signal passes through a 4 kHz output filter, a 2.5 kHz signal arises that did not come from the source.

An object of the present invention is to precisely reconstruct a sampled signal rather than approximate it, even in situations where the phase of the sampling signal is adjusted.

In the context of echo cancellation, it is an object of the present invention to accurately model in the frequency domain the transfer function of an echo channel impulse response.

It is an object of the present invention to compensate a sampled signal in the frequency domain for phase adjustments to the sampling instance in the time domain.

In the context of echo cancellation, it is an object of the present invention to precisely compute a new echo channel model in the frequency domain from an echo channel that will change as a result of an adjustment of the sampling phase in the time domain.

It is an object of the present invention that in modifying a channel impulse response model when sampling phase is adjusted that aliased frequencies be taken into account to ensure that the modified impulse response model accurately reflects the sampling phase adjustment.

The present invention seeks to overcome the above described limitations and meet these and other objects. For example, the present invention compensates in the frequency domain a transfer function of the channel impulse response for a sampling phase adjustment that occurs in time. In the example context of echo cancellation, that transfer function is an echo transfer function of the echo channel impulse response. The present invention accounts for aliased components present in the echo impulse response which is particularly important for maintaining accurate echo cancellation when sampling phase changes. Aliased components are identified and compensated for in the frequency domain by treating each spectral coefficient of the echo transfer function as the sum of a baseband component and an aliased component.

In a digital communication system, two transceivers communicate over a communication channel. Each transceiver samples a signal received over the communication channel in accordance with a sampling signal. The present invention may be advantageously employed in an echo canceller in each transceiver and typically is implemented as a digital filter. A signal transmitted from the transceiver is input to the digital filter and delayed for a plurality of delay stages to generate a series of input signals. Those input signals are transformed into the frequency domain to create a series of input spectral components. Each spectral component is then multiplied by a corresponding spectral filter coefficient to generate a corresponding product. The products are then summed to generate a filter output signal that corresponds to the expected echo. The filter output signal is subtracted from the received signal to cancel echo leaving some error signal that represents a remaining uncancelled echo in addition to a "far end" signal and noise. The spectral filter coefficients recursively are adapted to minimize that error.

When the phase of the sampling signal is adjusted, new values of the spectral filter coefficients are predicted in the frequency domain to accurately compensate for the sampling signal adjustment. Those predicted values model the echo transfer function after the phase of the sampling signal is adjusted. More specifically, the spectral filter coefficients are corrected in the frequency domain by an amount corresponding to the amount of time the sampling signal is adjusted.

Each spectral filter coefficient is analyzed as having at least two spectral components including a baseband frequency component corresponding to the echo and an aliased frequency component. In a preferred embodiment of the present invention, each spectral filter coefficient is predicted using two previously obtained values of the spectral filter coefficients. The baseband and aliased spectral components for each spectral filter coefficient are calculated based on the two previously obtained values of the spectral filter coefficient. By solving the two equations for the two unknowns, here the baseband and aliased spectral components, the current predicted value of the spectral filter coefficient is calculated.

While the present invention may be advantageously applied to echo cancellers, the present invention may also be used in any digital communication system where transceivers communicate over a digital communications channel. A signal received over the communications channel is sampled in accordance with a timing/sampling signal. A transfer function is developed corresponding to the impulse response of the communications channel. That transfer function is then compensated in the frequency domain for a phase adjustment in the sampling signal that occurs in the time domain. If the transfer function is a Fourier transform, the spectral coefficients of the transfer function in the frequency domain are corrected by an amount corresponding to the amount of time the timing signal is adjusted. As with the echo cancellation application described above, these spectral coefficients of the transfer function are analyzed as each having plural components such as a baseband frequency component and an aliased frequency component.

A significant advantage of the approach of the present invention is that in addition to accurately compensating for sampling phase adjustments, traditional sampling constraints are considerably relaxed. In other words, lower sampling frequencies can be used because an adaptive digital filter in accordance with the present invention accounts for aliased frequency components generated as a result of the sampling frequency being less than twice as high as the highest frequency in the sampled signal. Reduced sampling rates translate directly into reduced monetary and signal processing costs. Because the present invention reconstructs a received signal from signal samples taking into account aliased frequency components, the fact that a signal is no longer sampled at greater than twice the highest frequency component of received signal it does not undermine the accuracy of the reconstructed signal.

A better understanding of the features and advantages o the present invention will be obtained by reference to the following detailed description of the invention and the accompanying drawings which set forth an illustrative, non-limiting embodiment in which the principles of the present invention are utilized.

DETAILED DESCRIPTION OF THE DRAWINGS

In the following description, for purposes of explanation and not limitation, specific details are set forth, such as particular interfaces, circuits, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1A:
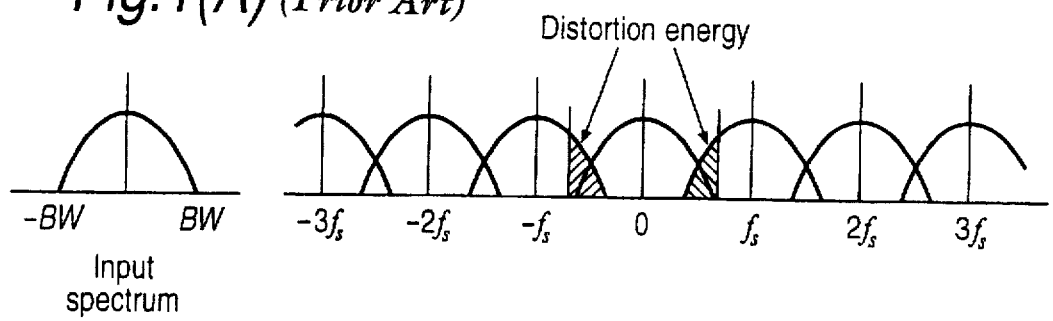
FIGS. 1(A) and 1(B) are graphs illustrating principles of the Nyquist sampling theorem and foldover distortion/aliasing resulting from undersampling.
Figure 1B:
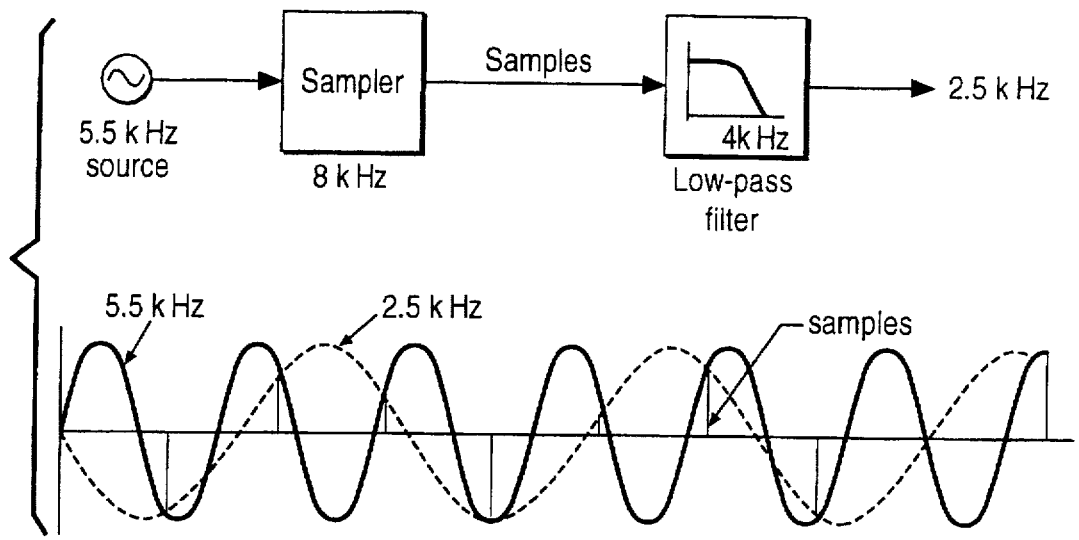
Figure 2:
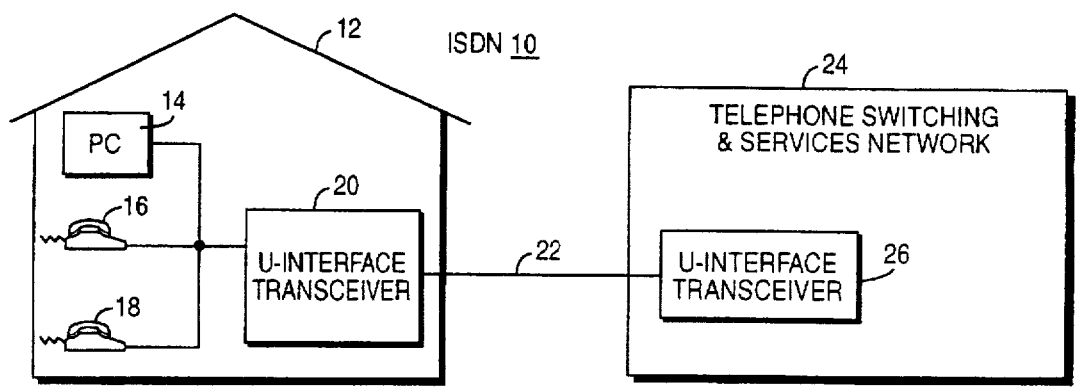
FIG. 2 is a function block diagram of an example of a digital ISDN communication system in which the present invention may be applied.

FIG. 2 shows an overall block diagram of one data communications environment, i.e., the integrated services digital network (ISDN) 10, to which the present invention may be applied. A building 12 may, for example, include telephone subscribers (16 and 18) and data subscribers (personal computer 14) linked over a local area network to a U-transceiver 20 (via an S-transceiver not shown). The U-transceiver 20 is connected by a 2-wire "subscriber loop" transmission line 22 to another U-transceiver 26 at telephone switching and services network 24 which provides digital switching and other messaging/call processing services. One important function of the U-transceivers 20 and 26 is the accurate and stable recovery of timing information from an incoming digital signal sampled at the baud rate so that symbol synchronization is achieved between the two transceivers.

For purposes of illustration and description only, the present invention is described hereafter in the context of such an ISDN network that uses U-transceivers and 2B1Q line codes. In the ISDN, the 2-binary, 1-quaternary (2B1Q) line code is used which employs a four level, pulse amplitude modulation (PAM), non-redundant code. Each pair of binary bits of information to be transmitted is converted to a quaternary symbol (−3, −1, +1 and +3). For example, "00" is coded to a −3, "01" is coded to a −1, "10" is coded to a +3, and "11" is coded to a +1. However, as will be appreciated by those skilled in the art, the present invention may be applied to other types of data communication networks and other types of line codes/symbols.

Figure 3:
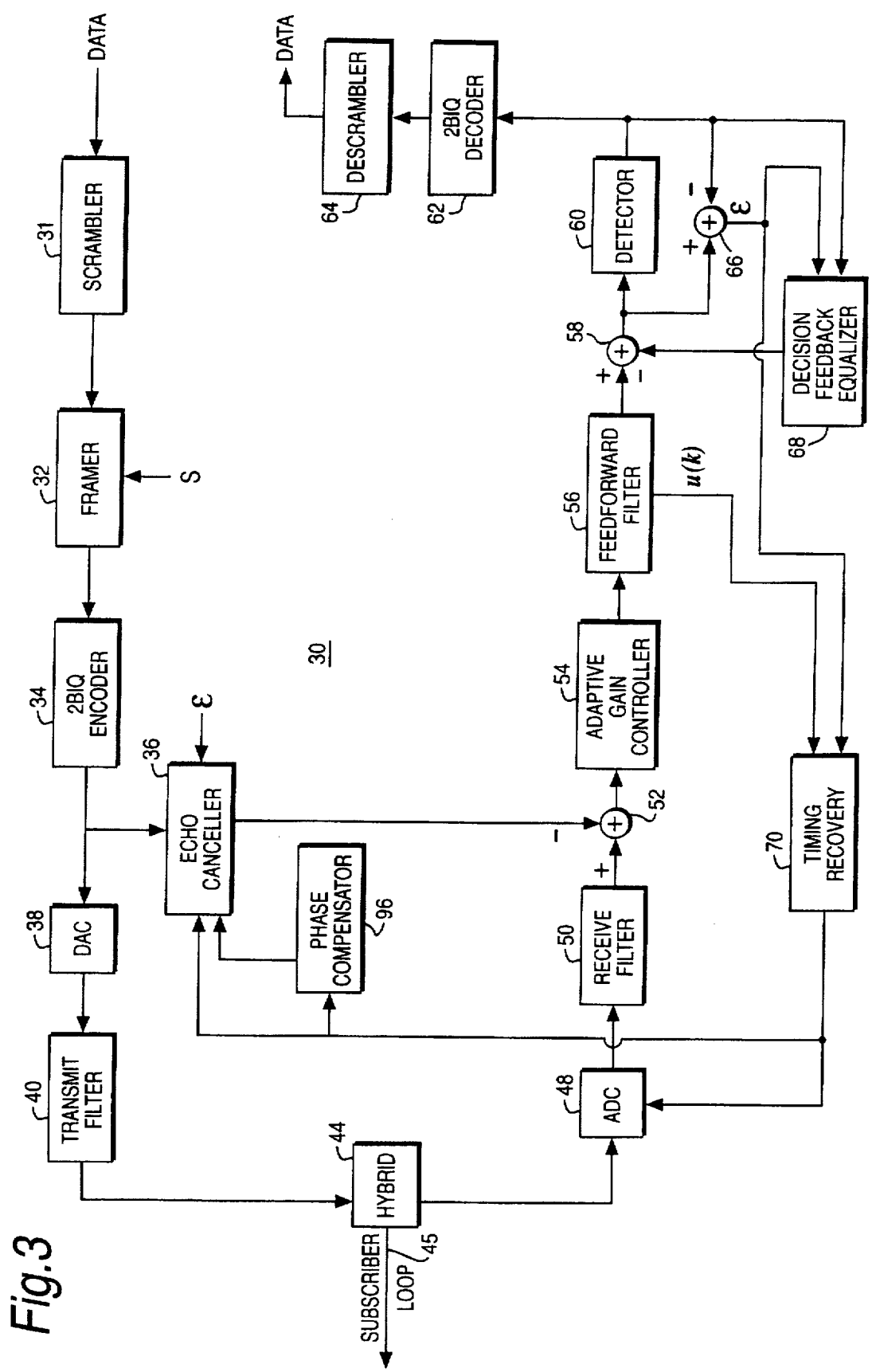
FIG. 3 is a function block diagram of a U-type transceiver that may be used in an ISDN.

Reference is now made to FIG. 3 which illustrates a U-interface transceiver 30 comprising a transmitter and receiver. Again, although the present application is being described in conjunction with a U-interface transceiver for use in conjunction with an ISDN digital communications network, the present invention of course could be applied to other high speed data environments such as high bit rate digital subscriber lines (HDSL), etc. Binary data for transmission is applied to a scrambler 31 which encodes the data into pseudo-random bit stream formatted by a framer 32 into frames of 240 bits or 120 (2B1Q) symbols in accordance with ISDN specification T1D1. The framer inserts a 9-symbol signaling word used for frame synchronization in each frame of data so that 111 symbols are left for the scrambled data.

The framed and scrambled binary signal is applied to a 2B1Q encoder where it is converted into a parallel format by a serial-to-parallel converter which produces digits in the combinations of 00, 01, 10, and 11. Digit-to-symbol mapping in the encoder produces the four corresponding symbol levels −1, +1, −3, and +3. Digital-to-analog converter (DAC) 38 converts the encoded signal to a voltage level suitable for application to the hybrid 44 which is connected to subscriber loop 45. The transmit filter 40 removes high frequencies from the digital pulses output by the digital-to-analog converter 38 to reduce cross-talk and electromagnetic interference that occur during transmission over the subscriber loop 45.

Incoming signals from the subscriber loop 45 are transformed in hybrid 44 and processed by the receiver which, at a general level, synchronizes its receiver clock with the transmitter clock (not shown) so that the received signal can be sampled at the symbol/baud transmission rate, i.e., the rate at which symbols were transmitted at the far end of the loop. The received signal is converted into a digital format using analog-to-digital converter (ADC) 48. The sampling rate of the analog-to-digital converter 48, which is tied to the receiver clock, is adjusted using a control signal from timing recovery circuit 70. For example, A-to-D converter 48 may sample at a sampling rate of 80 kHz even though it has a built-in higher frequency clock permitting phase adjustment in smaller intervals, e.g., a period of 15.36 MHz. Using a control signal from timing recovery circuit 70, a phase compensator 96 adjusts the phase of the timing recovery clock to account for frequency drift, phase jitter, and changes in a communications channel by stepping the clock signal forward or backward usually by a fixed time increment τ.

The digitized samples are filtered by a receive filter 50, the output of which is provided to summing block 52. Receive filter 50 increases the signal-to-noise ratio of the received signal by suppressing the "tail" of the received signal. The other input to summer 52 is an output from echo canceller 36. As described above, pulses transmitted onto subscriber loop 45 result in echo on the receiver side of the hybrid 44 due to impedance mismatch. Unfortunately, it is difficult to separate the echoes of these transmitted pulses (using for example a filter) from the pulses being received from subscriber loop 45. Accordingly, echo canceller 36 generates a replica of the transmitted pulse waveform and subtracts it at summer 52 from the received pulses. The echo canceller is adjusted based upon an error signal between the received symbol and the detected symbol output at summer 66. Such an adaptive echo canceller is typically realized as a traversal, finite impulse response (FIR) filter whose impulse response is adapted to the impulse response of the echo path. The error is used to adjust the filter coefficients to "converge" the filter's response to the impulse response model of the communications channel. In addition and as mentioned above, when timing adjustments are made to the sampling instance of the received signal using phase compensator 96, the direction (forward or backward in time) and magnitude τ of that adjustment are provided to the echo canceller 36 so that the impulse response of the echo path modeled by the filter coefficients are accurately adjusted to accommodate that phase change as is described in detail below.

The echo cancelled signal is processed by adaptive gain controller 54 to adjust the amplitude to levels specified for the symbols in the 2B1Q line code. In general, the gain applied to the input signal is adapted by comparison of the input signal to fixed amplitude thresholds and increasing or decreasing the gain as necessary to achieve the amplitudes standardized for symbols −3, −1, +1, and +3. The output of the adaptive gain controller is provided to a feedforward filter 56 which in physical terms enhances high frequencies of pulses in the received signal which translates into an increase in the steepness or slope of the rising edge of the digital pulse. In functional terms, known digital communications systems refer to this feedforward filter 56 as a precursor filter because its purpose is to suppress the precursor portion of received pulses.

The underlying principles of the present invention in the context of an echo canceller implemented using an adaptive digital filter are now introduced. However, those skilled in the art will appreciate that the principles of the invention are not limited to echo cancellers, and indeed, can be readily and advantageously applied to many other kinds of signal processing applications.

Contrary to many adaptive digital filters used in echo cancellers, the present invention analyzes and processes signals in the frequency domain because it is more accurate and precise. The discrete sequence of transmitted data from the transmitter portion of the transceiver is defined as an input signal represented by $x_n$; the filter output signal is represented by $y_n$; and the received signal made up of the far end signal, echo, and noise is represented by $d_n$. An error $\epsilon_n$ is generated from the difference between $d_n$ and $y_n$ with the difference indicating the degree to which the echo channel model modeled by the filter coincides with the actual channel that carries the echo.

An adaptive Least Mean Squares (LMS) signal processor processes the error and adapts filter coefficients to minimize the mean square error $\epsilon_n^2$ by adjusting the FIR filter coefficients as specified by a filter coefficients vector $C_n$. The error $\epsilon_n$ at the time instance $t_n$ equals $$\epsilon_n = d_n - y_n = d_n - C_n^T \times X_n = d_n - X_n^T \times C_n \quad \text{(EQ. 1)}$$

where:

$$C_n = [c_{n,0} \cdots c_{n,N-1}]^T \quad \text{(EQ. 2)}$$

$$X_n = [x_n \cdots x_{n-(N-1)}]^T \quad \text{(EQ. 3)}$$

$C_n$ is a vector of the filter coefficients, $X_n$ is a vector of the input sequence, and N depicts the length of the filter, i.e., the number of taps.

The filter coefficients vector $C_n$ is updated at the sampling rate, and on the i-th iteration is:

$$C_n = C_{n-1} + 2\mu \epsilon_{n-1} X_{n-1} \quad \text{(EQ. 4)}$$

where μ is a fixed constant which controls the stability and convergence rate of the filter.

The transform-domain equivalent of the filter output $y_n$ can be obtained by an orthogonal transformation, i.e.

$$y_n = C_n^T \cdot X_n = C_n^T \cdot W^{-1} \cdot W \cdot X_n = ((W^{-1})^T \cdot C_n)^T \cdot (W \cdot X_n) \quad \text{(EQ. 5)}$$

where W is the transformation matrix, i.e., $W^{-1} \cdot W$ is a unitary N×N matrix, and $W \cdot X_n$ and $(W^{-1})^T \cdot C_n$ are transformed vectors of the input sequence and the filter coefficients, respectively.

In the present description, a Discrete Fourier Transform (DFT) is used, i.e., $(W^{-1})^T = W^*$, where ( )* depicts a complex conjugate. If an input signal is real, the DFT algorithm replaces the N coefficients of the time domain filter with N/2+1 complex Fourier coefficients in the frequency domain, the other half of transform being conjugate symmetric. In other words, each Fourier or "spectral" coefficient is the value of the Fourier transform for a single discrete frequency.

The complex spectral coefficients, which are now defined as $A = (W^{-1})^T \cdot C_n$, are updated in the frequency domain with the same error term $\epsilon_n$ as in the time domain:

$$\epsilon_n = d_n - y_n = d_n - ((W^{-1})^T \cdot C_n)^T \cdot (W \cdot X_n) \quad \text{(EQ. 6)}$$

$$A_n = A_{n-1} + 2\mu \epsilon_{n-1} (W \cdot X_{n-1}) \quad \text{(EQ. 7)}$$

It can be shown that the spectral coefficients vector $A_\infty$ converges to the transform domain equivalent of the optimum solution in the time-domain. See for example, "Transform Domain LMS Algorithm," Narayan et al, *IEEE Trans., Acoust. Speech, Signal Processing*, Vol. ASSP-31, no. 3, June 1983, pp. 609–615. A uniform convergence rate may be obtained if the spectral coefficients $\alpha_{n,k}$ are updated independently using an individual step size of $\mu_k$ as follows:

$$a_{n,k} = a_{n-1,k} + 2\mu_k \epsilon_{n-1}(W \cdot X_{n-1})_k \qquad (EQ.\ 8)$$

where $$\mu_k = \frac{\mu}{E|W \cdot X_{n-1}|_k^2} \text{ or } \mu_k = \frac{\mu}{\sqrt{E|W \cdot X_{n-1}|_k^2}}$$

Figure 4:
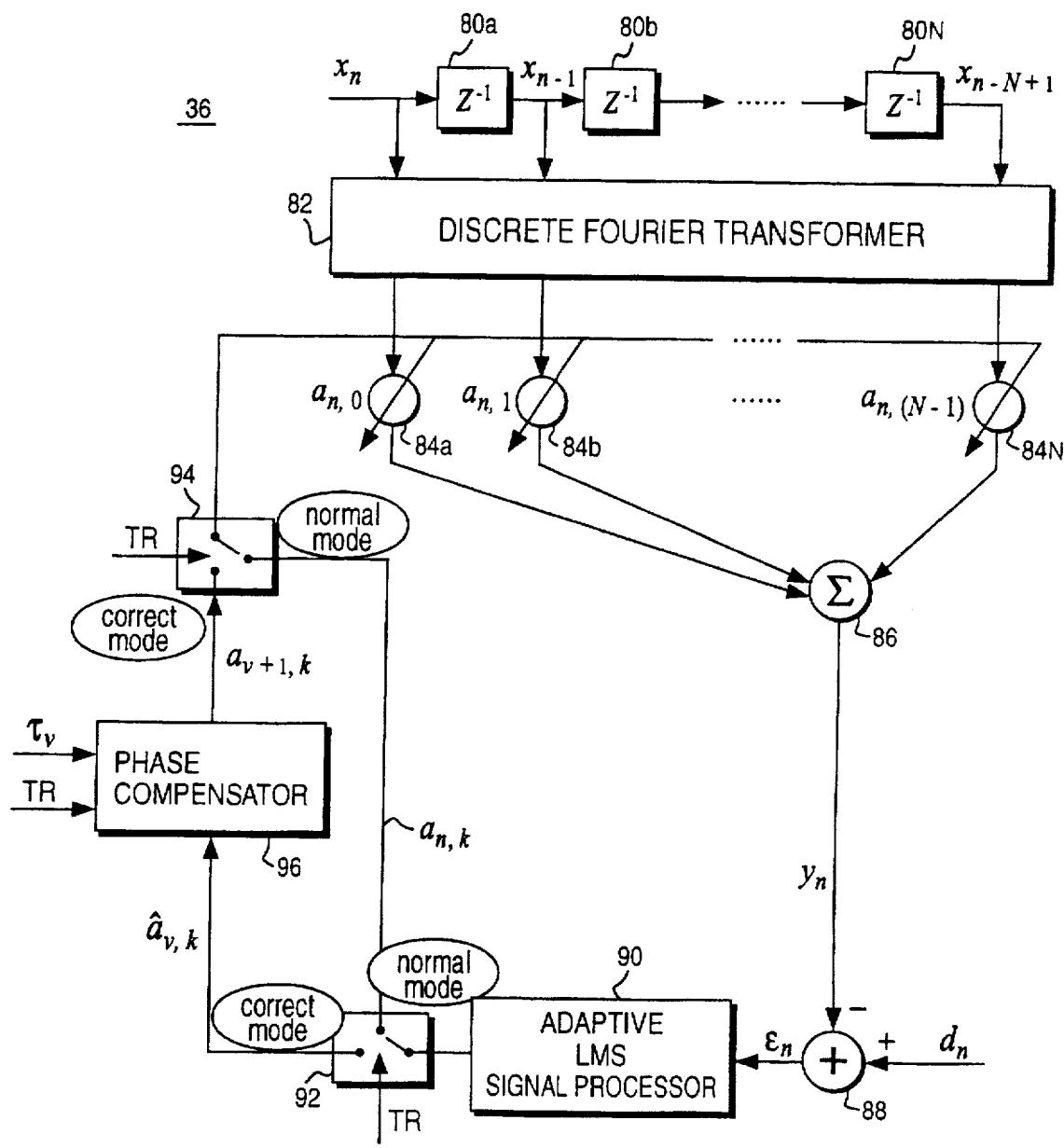
FIG. 4 is a function block type diagram showing an example application of the present invention in an echo canceller.

One example of the present invention is now described using a transform domain adaptive echo canceller 36 as illustrated in FIG. 4 that may be implemented using discrete hardware components, a DSP, an ASIC chip, a programmed microprocessor, or other equivalent signal processor(s). The transmitted signal $x_n$ from a "near end" transceiver is delayed through delay elements 80a, 80b, . . . , 80N to generate N+1 discrete signal samples transformed in Discrete Fourier Transformer 82. A discrete Fourier transform DFT is readily computed in real time, and the frequency domain LMS algorithm such as that described above executed by the adaptive LMS signal processor 90 may be more effectively implemented as a fast Fourier transform (FFT) or frequency sampling filter.

The echo canceller 36 (implemented as an adaptive digital filter) essentially estimates the echo impulse response of the echo path in the time domain. Like any communications channel, that echo path or channel is a function of many variables some of which change such as the transmission line, transformer, balance, network transmit and receive filters, sigma-delta modulator, etc. in wire line systems, and fading and adjacent channel interference in radio systems. In the frequency domain, the adaptive LMS signal processor 90 converges the adaptive filter coefficients to the overall transfer function $F(\omega)$ of the echo communications channel, i.e., the Fourier transform of the echo impulse response.

A significant advantage of the present invention operating in the frequency domain is that a phase correction to the sampling clock, i.e., a time shift that in practice usually is only approximated in the "time domain," may be precisely and readily implemented using the "shift theorem" in the frequency domain as set forth below:

$$f(t) <=> F(\omega) \qquad (EQ.\ 9)$$

$$f(t-\tau) <=> F(\omega)e^{-j\omega\tau}$$

In essence, the shift theorem states that time shifting the impulse response by time $\tau$ in the time domain corresponds to shifting the phase of the transfer function of the impulse function in the frequency domain.

One example of a approximation technique used to adjust timing phase in the time domain is linear interpolation. The term $e^{-j\omega\tau}$ has a power series expansion truncated to the first two terms as follows $$F(\omega)e^{-j\omega\tau} = F(\omega)(1-j\omega\tau) = F(\omega) - j\omega F(\omega)\tau \qquad (EQ.\ 10)$$

Taking the inverse Fourier transform produces $$F(\omega) - j\omega F(\omega)\tau \rightarrow f(t) + \frac{d}{dt} f(t)\tau \qquad (EQ.\ 11)$$

Equation (11) is the formula for linear interpolation the time domain. Truncating the power series expansion to only two of its terms means that all of the information contained in the higher terms is lost. Thus, accuracy is necessarily limited.

The inventor of the present invention recognized that using the shift theorem, changes in the timing phase influence the spectral coefficients in the DFT model of the echo channel transfer function (i.e., the Fourier transform of the echo channel impulse response). Since the direction of the phase correction and the magnitude of the phase increment are known, e.g., from the timing recovery unit 70 in FIG. 3, the frequency shift corresponding to that phase adjustment direction and magnitude can be accurately reflected in the echo channel model.

The received signal includes the "far end" transmitted signal, noise, and the echo signal from the "near end" transmitted signal reflected back to the near end receiver. The far end transmitted signal, noise, and the echo signal are all affected by the characteristics of the communications channel and by intersymbol interference. Accordingly, the signal received by the echo canceller 36 in an ideal case when no "far end" signal or noise are present is represented by $$d_n = \sum_{i=-1}^{\infty} x_i \cdot f(t_n - iT) \qquad (EQ.\ 12)$$

where: of the originally transmitted symbol sequence $f(t)$ is the echo impulse response in the time-domain, $x_i$ is a symbol value, e.g., $x_i \pm 1, \pm 3$ for a 2B1Q code, $t_n$ is a sampling instant, and T is a sampling interval ($T=1/f_s$).

Returning to FIG. 4, the spectral components output by discrete Fourier transformer 82 are multiplied by adaptive filter coefficients 84a, 84b, . . . 84n corresponding to $a_{n,0}, a_{n,1}, \ldots, a_{n,(N-1)}$. Each of the "weighted" spectral components is then summed in summer 86 to generate the filter output signal $y_n$ which is the filter's estimate of the echo. A difference is obtained between the received signal $d_n$ and the filter output $y_n$ in combiner 88 to generate a difference or error signal $\epsilon_n$. Adaptive LMS signal processor 90 then updates the filter coefficients $a_{n,k}$ in accordance with equation (8) set forth above.

In a normal mode of operation, where the phase of the sampling signal is not abruptly changed/corrected, these updated filter coefficients $a_{n,k}$ are returned to multipliers 84a, 84b . . . 84n and "weight" the next set of frequency components generated by discrete Fourier transformer 82. However, the present invention also provides for a correction mode, implemented for purposes of illustration using switches 92 and 94, to route the updated filter coefficients from the adaptive LMS signal processor 90 through a recursive phase shift compensator 96. Whenever a phase correction to the sampling signal is implemented using timing recovery circuit 70 and phase adjuster 37 of FIG. 3, the timing recovery and phase adjuster circuit generate switching control and enabling signals (TR) which are provided to switches 92 and 94 as well as to recursive phase shift compensator 96. In addition, the timing recovery circuit 70 and phase adjuster 37 provide the direction and magnitude of phase shift $\tau_y$ to recursive phase shift compensator 96. In the correction mode, the recursive phase shift compensator 96 corrects the updated filter coefficients using the shift theorem of equation (9) so that they accurately model the echo transfer function when the phase change occurs. A sampling phase shift $\tau$ is effected in each filter coefficient as a spectral phase shift $e^{-j\omega\tau}$.

Figure 5:
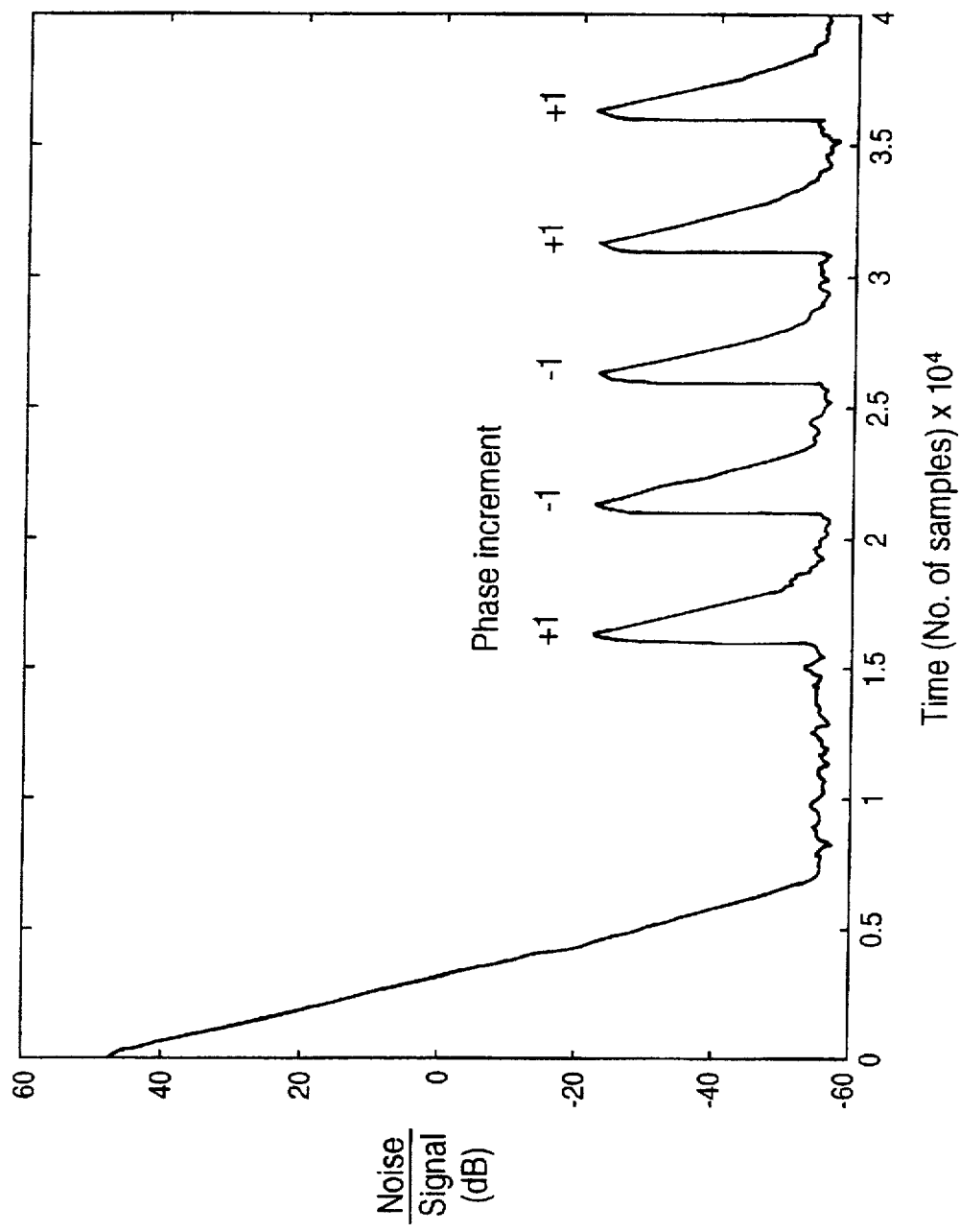
FIG. 5 is a graph illustrating increased signal-to-noise ratio coincident with phase adjustment.

The simulated performance of the echo canceller 36 is illustrated for an example case in FIG. 5. The example case simulates line configurations specified by ANSI, "Integrated Services Digital Network (ISDN)—Basic Access Interface for Use on Metallic Loops for Application on the Network Side of NT (layer 1 Specification)," ANSI T1.601-1988, Jan. 9, 1991, and by ETSI, "Transmission and Multiplexing (TM): Integrated Services an Digital Network (ISDN) basic rate access digital transmission system on metallic local line," ETSI Technical Report, ETR 080, July 1993. The noise to received far end signal (i.e., the desired signal) ratio shows an extremely low value after the filter converges, e.g., −50 dB. Stated differently, the echo that actually needs to be cancelled an the near end transceiver is cancelled by echo canceller 36 in the normal mode with a very high degree of precision.

However, this precision is adversely impacted by abrupt changes in the sampling phase. In other words, when the sampling instance must be shifted forwards or backwards some incremental amount, shown FIG. 5 just after times 1.5, 2, 2.5, 3, and 3.5, there is a sharp increase in noise. Consequently, correcting the spectral filter coefficients of the adaptive filter in the frequency domain by simply following the shift theorem of equation (9) fails to maintain continuous and accurate echo cancellation when the sampling phase is adjusted. The reason for this failure is aliasing. Some of the spectral components of the sampled received signal "d" shown in FIG. 5 corresponding to the received echo exceed the Nyquist frequency, and as a result, "fold over" into the baseband spectrum which is defined as less than one half of the sampling rate. Because these aliased components are ignored by the shift theorem defined in equation (9), the spectral coefficients of the adaptive filter 36 are not accurately adjusted, and the signal-to-noise ratio deteriorates causing the noise spikes shown in FIG. 4. In addition, the magnitude of the Fourier transfer function of the echo path impulse response is not constant. Instead, it varies dramatically when the sampling phase is changed.

Figure 6:
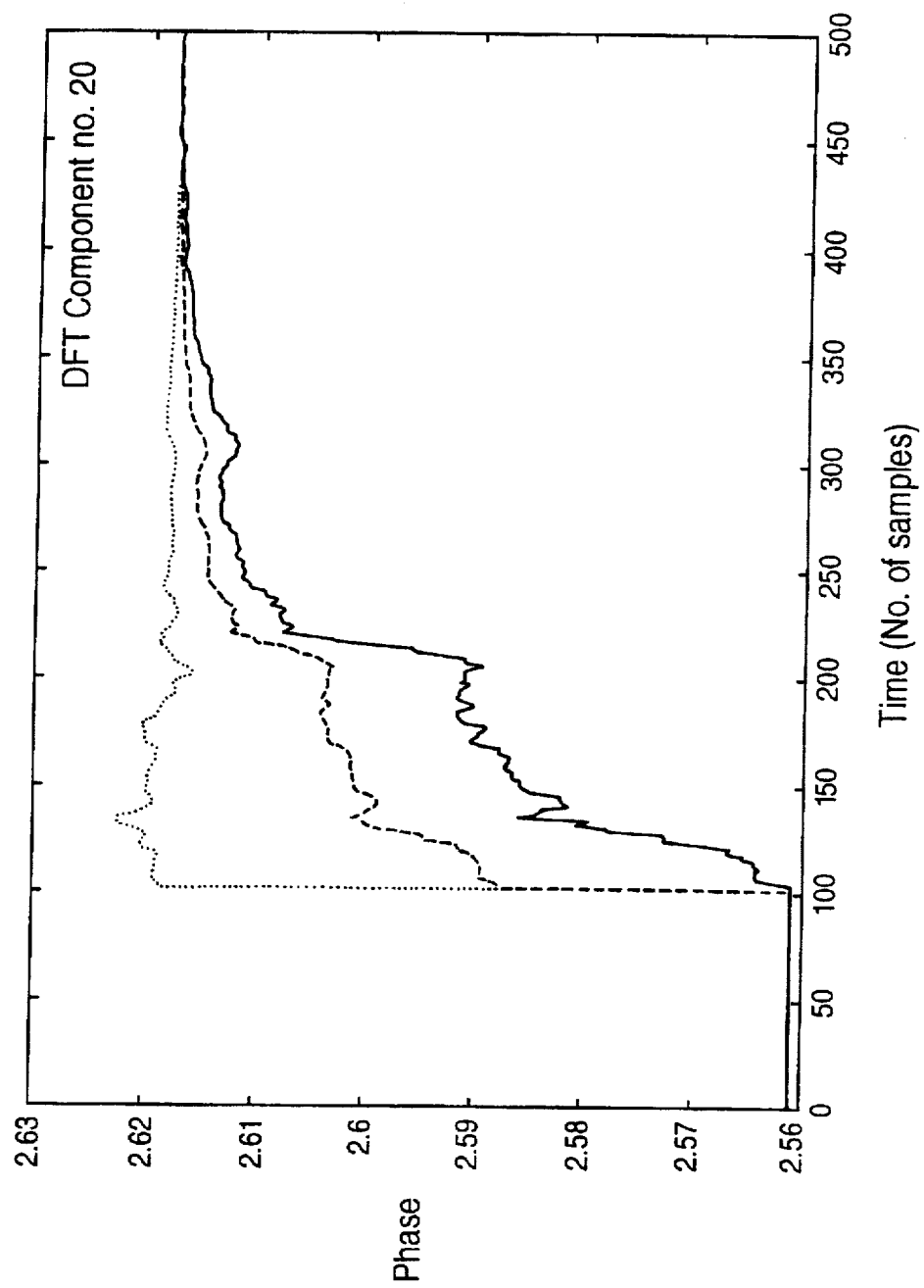
FIGS. 6 and 7 are graphs illustrating the variation of the phase and magnitude, respectively, of the echo-path transfer function after a change of sampling instance for the cases of no compensation (solid line), phase compensation according to the frequency shift theorem (dashed line), and phase forcibly set to the correct value (dotted line)
Figure 7:
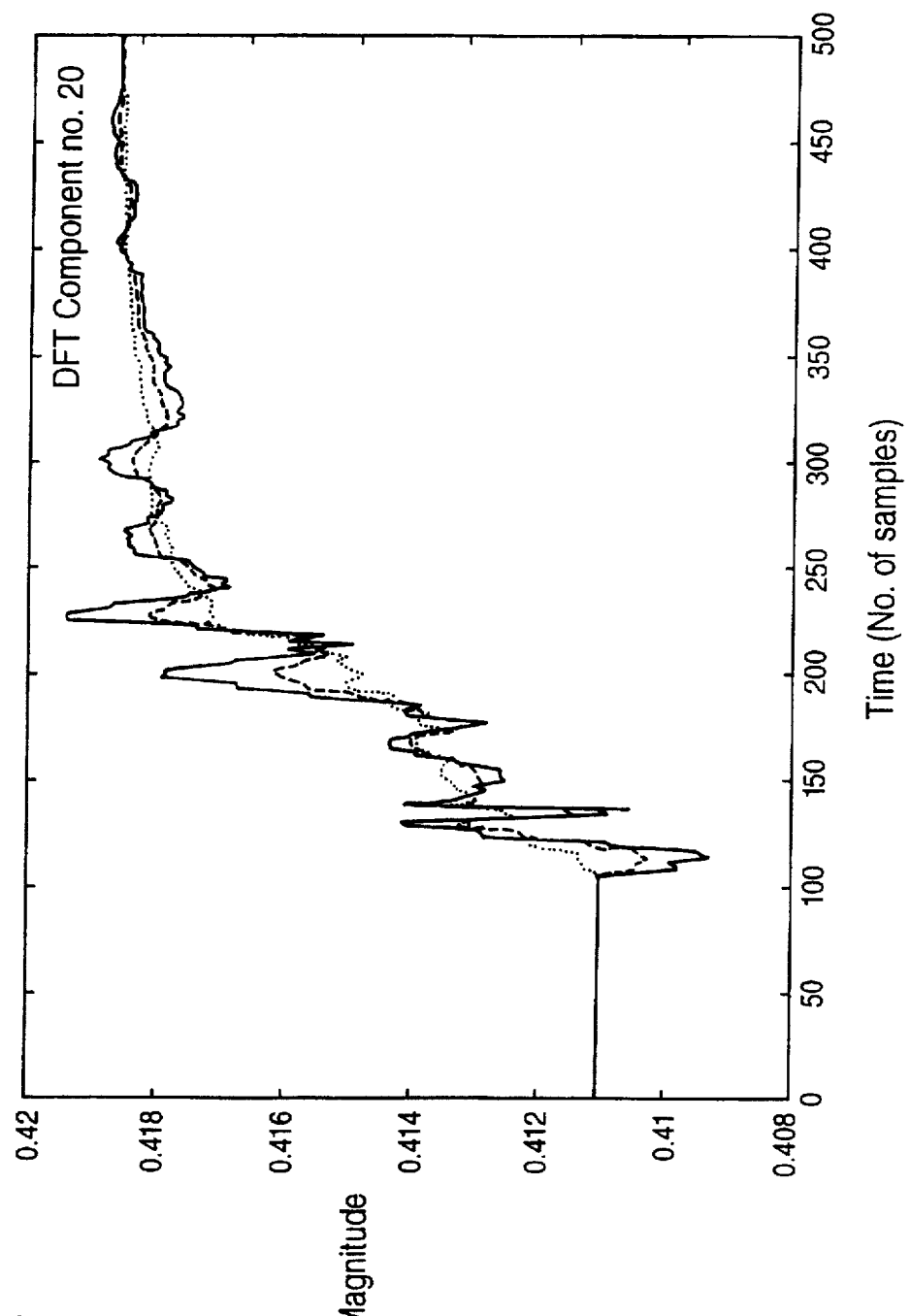

To illustrate the impact of the variation of sampling phase and magnitude on the echo transfer function, reference is now made to FIGS. 6 and 7. FIG. 6 graphs the phase of the echo transfer function after a change of sampling instance for the following three situations: no compensation (shown as a solid line), compensation according the shift theorem as described above (shown as a dashed line), and the correct values (shown as a dotted line). FIG. 7 graphs the magnitude of the echo transfer function after a change of sampling instance for the following three situations: no compensation (shown as a solid line), compensation according the shift theorem as described above (shown as a dashed line), and the correct values (shown as a dotted line). Thus, while the compensation according the shift theorem approach is superior to no compensation at all with respect to accommodating changes in the sampling instance, the inventor of the present invention recognized that these folding or aliased frequencies must specifically be taken in account in the compensation to fully compensate for such phase adjustments.

From the recognition that out of band components ($|f|>f_s/2$) produce an erroneous evaluation of the frequency content of the echo transfer function came the idea that each adaptive filter coefficient vector $A_\infty$ (defined previously in EQS. 7 and 8) should be considered as the vector sum of plural translated transforms. In other words, since the sampled echo signal contains plural frequencies, like the baseband and aliased frequencies, the filter coefficients include plural spectral components as represented mathematically below.

$$a_{\infty,k} = A_\infty(\omega_k) = \sum_{m=-\infty}^{\infty} F(\omega_k - m \cdot \omega_s) \qquad (EQ.\ 13)$$

where $\omega_s = 2\pi f_s$ is the radian sampling frequency, $$\omega_k = k \cdot \frac{\omega_s}{N}$$

is the radian frequency time instant for $k=1\ldots N-1$, and $N$ is the DFT length, i.e., the number of spectral coefficients corresponding to the number of filter "taps." $F(\omega)$ represents a continuous time echo transfer function. Assuming that the spectral content of $F(\omega)$ for the frequencies above the sampling frequency ($\omega > \omega_s$), is negligible in most communications applications (like ISDN), equation (13) is solved for $m=0$ and $m=1$. As a result, an accurate link is established between phase changes in the time domain and phase changes in the frequency domain as follows:

$$f(t-\tau) \Leftrightarrow F(\omega_k) \cdot e^{-j\omega_k\tau} + F(\omega_k - \omega_N) \cdot e^{-j(\omega_k - \omega_N)\tau} \qquad (EQ.\ 14)$$

The phase shifts introduced by each term in equation (14) are predictable and may be incremented independently. Therefore, each filter spectral coefficient $a_{v,k}$ may be regarded as the superposition of two complex spectral components: a baseband component $b_{v,k}$ (corresponding to the first term in EQ. 14) and an aliased or folded component $b_{v,N-k}$ from the band $\omega_s/2\omega_s$ (corresponding to the second term in EQ. 14):

$$\alpha_{v,k} = b_{v,k} + b_{v,N-k} \qquad (EQ.\ 15)$$

where $v$ is a time instant when a sampling phase change is made.

Accordingly, since the baseband and aliased spectral components $b_{v,k}$, $b_{v,N-k}$ for each current spectral filter coefficient $\alpha_{v,k}$ can be obtained as will be described below, the value of the predicted spectral filter coefficient $\alpha_{v+1,k}$ after the phase correction is accurately calculated using a modified shift theorem set forth in equation 14:

$$a_{v+1,k} = b_{v,k} \cdot e^{-j2\pi k \frac{\tau_v}{N}} + b_{v,N-k} \cdot e^{-j2\pi(k-N)\frac{\tau_v}{N}} \qquad (EQ.\ 16)$$

It is assumed that the filter coefficients $\alpha_{v,k}$ have converged at the time instance $v$, i.e., they are constant except for small statistical fluctuations. Usually, in average of the filter coefficients $\alpha_{v,k}$ is used instead of the current filter coefficient values. Recognizing that time instance $v+1$ is the first sampling instance after phase correction, the new predicted filter coefficient values $\alpha_{v+1,k}$ maintain echo cancellation accuracy despite abrupt changes in sampling phase and despite the presence of aliased frequency components.

Equation 16 may be expressed more compactly using matrix notation:

$$a_{v+1,k} = \begin{bmatrix} 1 & 1 \end{bmatrix} \begin{bmatrix} e^{-j2\pi k \frac{\tau_v}{N}} & 0 \\ 0 & e^{-j2\pi(N-k)\frac{\tau_v}{N}} \end{bmatrix} \begin{bmatrix} b_{v,k} \\ b_{v,N-k} \end{bmatrix} \qquad (EQ.\ 17)$$

However, the filter coefficient $\alpha_{v+1,k}$ may be predicted using the value of the coefficient at two earlier sampling instances, i.e., two prior values of $\hat{\alpha}_{v,k}$ and $\hat{\alpha}_{v-1,k}$ determined in accordance with the following:

$$\begin{bmatrix} \hat{a}_{\nu-1,k} \\ \hat{a}_{\nu,k} \end{bmatrix} = \begin{bmatrix} e^{j2\pi k \frac{\tau_{\nu-1}}{N}} & e^{-j2\pi(N-k)\frac{\tau_{\nu-1}}{N}} \\ 1 & 1 \end{bmatrix} \begin{bmatrix} b_{\nu,k} \\ b_{\nu,N-k} \end{bmatrix} \quad \text{(EQ. 18)}$$

One technique for obtaining the values of spectral components $b_{\nu,k}$ and $b_{\nu,N-k}$ is now described. The problem in equation (17) is that of solving for $\alpha_{\nu+1,k}$ which is a function of two unknowns $b_{\nu,k}$ and $b_{\nu,N-k}$. However, if there are two similar equations that we have values for, i.e., there is a value for $\alpha_{\nu-1,k}$ (the first equation) and a value for $\alpha_{\nu,k}$ (the second equation), those two equations can be solved to determine the values of the two unknown variables $b_{\nu,k}$ and $b_{\nu,N-k}$ using basic algebraic substitution techniques employed in solving any two equations having only two unknowns. Once the values $b_{\nu,k}$ and $b_{\nu,N-k}$ are known, it is then easy to calculate $\alpha_{\nu+1,k}$ using equation (17).

Inserting equation (18) into equation (17) and performing elementary matrix manipulation, the spectral filter coefficients may be predicted in accordance using the following:

$$a_{\nu+1,k} = \frac{1}{q_k} \begin{bmatrix} e^{-j2\pi k \frac{\tau_\nu}{N}} & e^{j2\pi(N-k)\frac{\tau_\nu}{N}} \end{bmatrix} \quad \text{(EQ. 19)}$$

$$\begin{bmatrix} 1 & -e^{-j2\pi(N-k)\frac{\tau_\nu}{N}} \\ -1 & e^{j2\pi k \frac{\tau_{\nu-1}}{N}} \end{bmatrix} \begin{bmatrix} \hat{a}_{\nu-1,k} \\ \hat{a}_{\nu,k} \end{bmatrix}$$

where $$q_k = e^{j2\pi k \frac{\tau_{\nu-1}}{N}} - e^{-j2\pi(N-k)\frac{\tau_{\nu-1}}{N}} = e^{j2\pi k \frac{\tau_{\nu-1}}{N}} \cdot (1 - e^{-j2\pi\tau_{\nu-1}}).$$

In a preferred example embodiment, the predicted filter coefficients $a_{\nu+1,k}$ calculated in accordance with equation (19) above can be solved after some elementary manipulation of equation (19) as follows:

$$a_{\nu+1,k} = [\hat{a}_{\nu-1,k} \quad \hat{a}_{\nu,k}] \begin{bmatrix} e^{-j2\pi \frac{k}{N}(\tau_{\nu-1}+\tau_\nu)} \cdot \frac{1 - e^{j2\pi\tau_\nu}}{1 - e^{-j2\pi\tau_{\nu-1}}} \\ e^{-j2\pi \frac{k}{N}\tau_\nu} \cdot \frac{e^{j2\pi\tau_\nu} - e^{-j2\pi\tau_{\nu-1}}}{1 - e^{-j2\pi\tau_{\nu-1}}} \end{bmatrix} \quad \text{(EQ. 20)}$$

where we introduce $$\begin{bmatrix} c_{1,k} \\ c_{2,k} \end{bmatrix} = \begin{bmatrix} e^{-j2\pi \frac{k}{N}(\tau_{\nu-1}+\tau_\nu)} \cdot \frac{1 - e^{j2\pi\tau_\nu}}{1 - e^{-j2\pi\tau_{\nu-1}}} \\ e^{-j2\pi \frac{k}{N}\tau_\nu} \cdot \frac{e^{j2\pi\tau_\nu} - e^{-j2\pi\tau_{\nu-1}}}{1 - e^{-j2\pi\tau_{\nu-1}}} \end{bmatrix} \quad \text{(EQ. 21)}$$

Equation (20) reveals two things. First, if $\tau_\nu = -\tau_{\nu-1}$, then $$\begin{bmatrix} c_{1,k} \\ c_{2,k} \end{bmatrix} = \begin{bmatrix} 1 \\ 0 \end{bmatrix}.$$

Second, if $\tau_\nu = \tau_{\nu-1} = \tau$ or $\tau_\nu = \tau_{\nu-1} = -\tau$ then $$\begin{bmatrix} c(\tau)_{1,k} \\ c(\tau)_{2,k} \end{bmatrix} = \begin{bmatrix} c(-\tau)_{1,k} \\ c(-\tau)_{2,k} \end{bmatrix}^*,$$

where ( )* depicts the complex conjugate.
This means that the only difference is the sign of the imaginary part. As a practical result, only $\frac{N}{2}+1$ coefficients would be stored in a look-up table since they are complex conjugates. This simplifies the process considerably because the coefficients $c_{1,k}$ and $c_{2,k}$ do not have to be recalculated every time the sampling phase is adjusted by $\pm\tau$.

Figure 8:
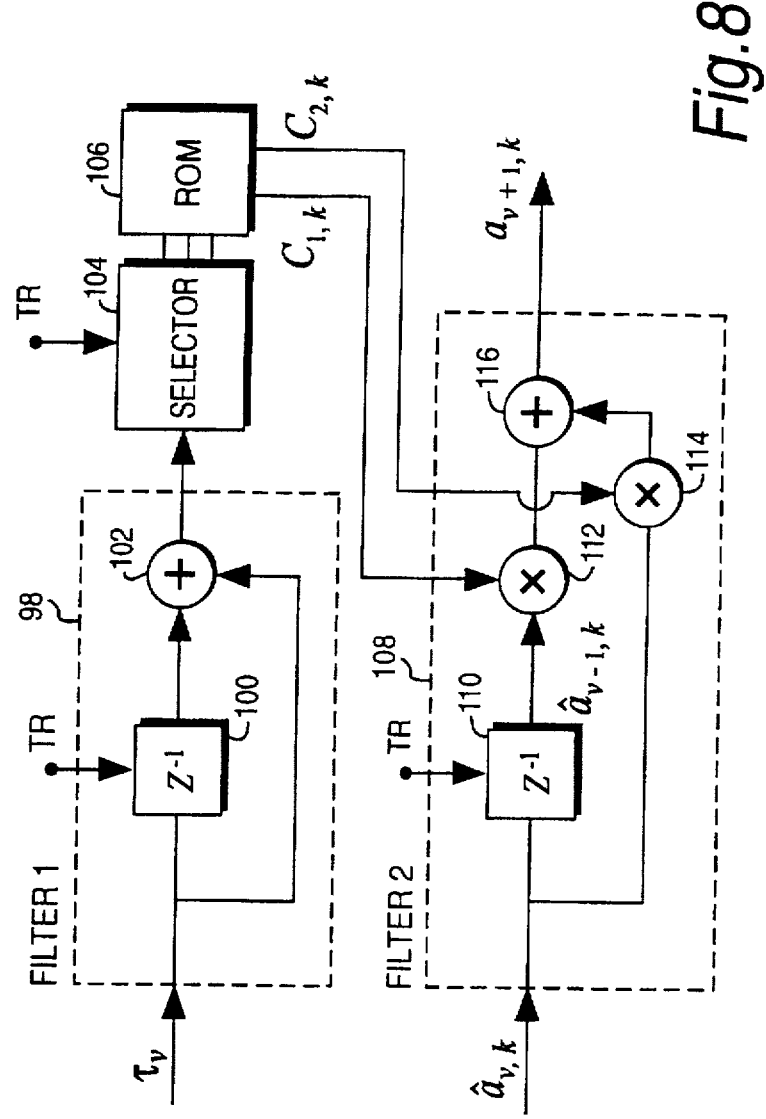
FIG. 8 is a function block type diagram showing further illustrative details of the phase comparator 37 shown in FIGS. 3 and 4.

One approach for implementing the recursive phase shift compensator 96 will now be described in conjunction with FIG. 8. FIG. 8 shows a first filter 98 which consists of a single delay element 100 and summer 102. The first filter 98 receives a current phase change value $\tau_\nu$ from the timing recovery circuit 70. By summing the current phase change with the prior phase change $\tau_{\nu-1}$, assuming that the magnitude of the phase change $\tau$ is the same for each phase change, the output of filter 98 is either negative, zero, or positive corresponding to the sign of the phase change. If the two consecutive values of $\tau$ are both positive, the output of filter 98 is positive; if their signs are different, the output of the filter is zero; and if their signs are both negative, the output of filter 98 is negative.

The output of filter 98 provides an input to selector 104 whose function is to address values of the coefficients $c_{1,k}$ and $c_{2,k}$. All three possible values of the coefficients $c_{1,k}$ and $c_{2,k}$ for various successive phase changes are determined in accordance with EQ. (21) and stored in ROM 106 in look-up table format. Thereafter, the appropriate values of $c_{1,k}$ and $c_{2,k}$ are retrieved from ROM 106 and used to adjust the adaptive filter coefficients $a_{\nu+1,k}$ in accordance with EQ. (20):

$$a_{\nu+1,k} = [\hat{a}_{\nu-1,k} \quad \hat{a}_{\nu,k}] \begin{bmatrix} c_{1,k} \\ c_{2,k} \end{bmatrix} \quad \text{(EQ. 22)}$$

Second filter 108 receives input spectral filter coefficients $\hat{a}_{\nu,k}$ updated by adaptive LMS signal processor 90 via switch 92 which is then delayed in delay 110 to provide at its output the immediately preceding spectral filter coefficients $\hat{a}_{\nu-1,k}$. The coefficients $c_{1,k}$ and $c_{2,k}$ retrieved by selector 104 from ROM 106 in accordance with the sign of the phase change are used to "weight" the two prior sets of filter coefficients $\hat{a}_{\nu,k}$ and $\hat{a}_{\nu-1,k}$ using multipliers 112 and 114, respectively. The multiplier products are then summed in summer 116 to generate the predicted spectral filter coefficients $a_{\nu+1,k}$ compensated for the most recent sampling phase change.

Since in most applications, the magnitude of a sampling phase correction is set to a constant incremental value $\tau$ as mentioned above, the phase is either advanced by $\tau(+\tau)$ or retarded by $\tau(-\tau)$. As a result, if the sampling instance is first adjusted by $-\tau$ and then subsequently by $+\tau$ (or first by $+\tau$ and then by $-\tau$), the net sampling phase change is zero. Accordingly, the same coefficients can be used that were used before the last sampling phase change occurred. In FIG. 8, the spectral filter coefficient $\hat{a}_{\nu-1,k}$ is multiplied in multiplier 112 by coefficient $c_{1,k}$ provided by ROM 106. Multiplier 114 multiplies $\hat{a}_{\nu,k}$ by the value of coefficient $c_{2,k}$ from ROM 106. Since $c_{1,k}$ equals "1" and $c_{2,k}$ equals "0" in the situation just described above, i.e., the situation where $t_\nu$ equals $-t_{\nu-1}$, the summation carried out in summer 116 is quite simple because $a_{\nu+1,k}$ equals $\hat{a}_{\nu-1,k}$. In other words, the same filter coefficient $\hat{a}_{\nu-1,k}$ used just before the last sampling phase adjustment may be used again without further calculation. With this technique, the calculation of the spectral filter coefficient $a_{\nu+1,k}$ in accordance with equation (20) is tremendously simplified. Even in situations where two consecutive phase adjustments of the same sign, i.e., $+\tau$ followed by +τ or −τ followed by −τ, a preferred implementation of calculating $a_{v+1,k}$ is to take advantage of the fact that the only difference between the two sets of coefficients $c_{1,k}$ and $c_{2,k}$ used by compensating the spectral filter coefficients $â_{v,k}$ and $â_{v-1,k}$ for phase adjustments is the sign of its imaginary part as described above.

The performance of the present invention implemented in a frequency domain adaptive echo canceller has been demonstrated using various computer simulations. A wide variety of communication conditions such as those recommended by ANSI and ETSI were analyzed with respect to phase changes in this sampling signal. One of the most severe test cases recommended by ANSI referred to as loop #1, which is the longest loop with greatest attenuation of the far end signal, was simulated to test an echo canceller employing the present invention with the simulation adding noise 25 dB below the far end signal. The simulation results are shown in FIG. 9.

Figure 9:
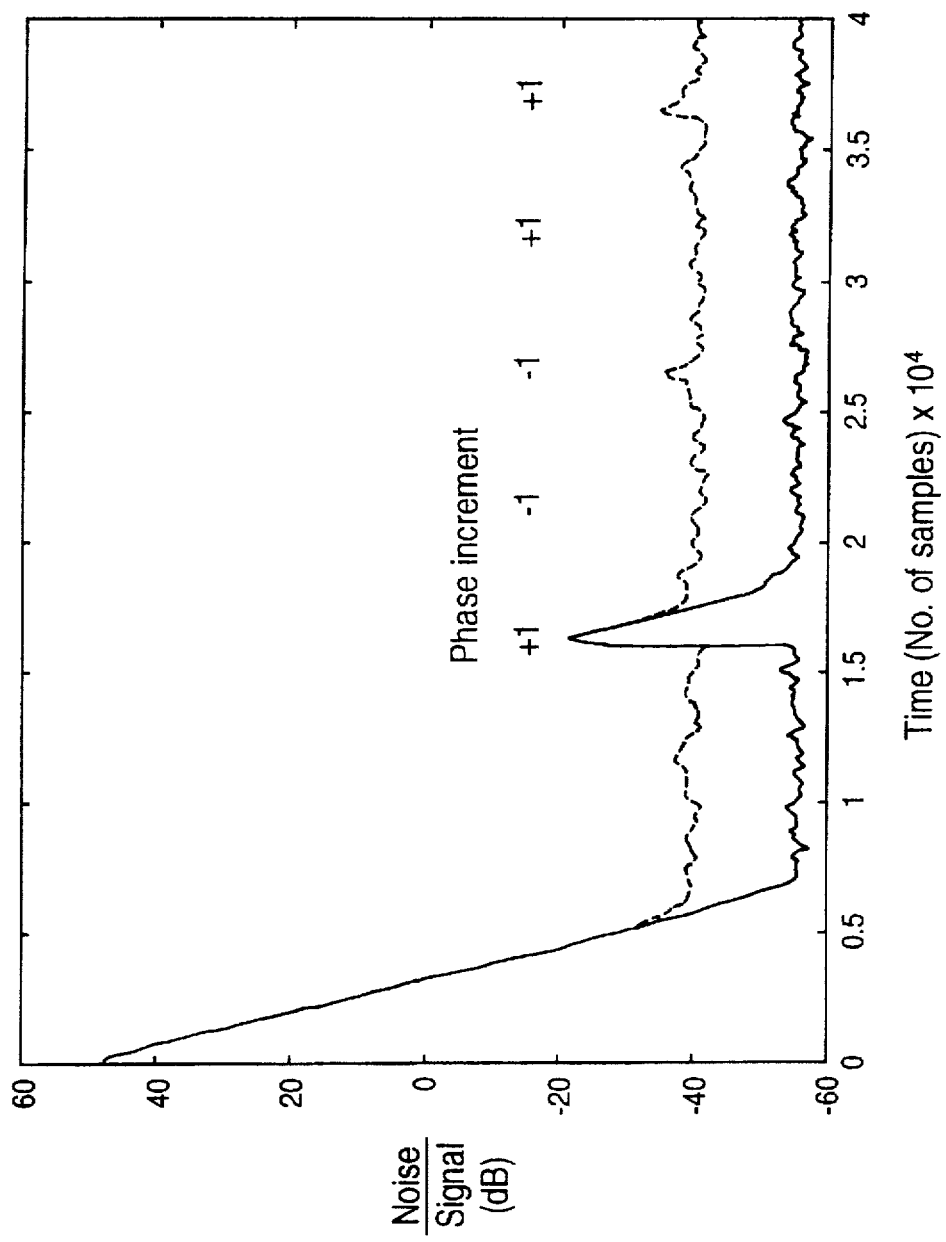
FIG. 9 is a graph illustrating compensation of a phase adjustment in accordance with one simulated example implementation of the present invention.

FIG. 9 shows a typical learning curve during a first abrupt change in the sampling instance. Comparing FIG. 5 with FIG. 9, and assuming that the change of sampling instance is ±T/192, the learning curve exhibits a strong rise after the sampling instance was changed for the first time only. However, during further operation of the echo canceller in accordance with the present invention, in contrast with the results shown in FIG. 5, almost perfect compensation of the sampling instant adjustments at times 2, 2.5, 3, and 3.5 is achieved. In other words, no transients are observed as the filter coefficients are switched to the predicted values. Of course, the first noise spike after the very first phase change at time 1.5 must be expected since the values of $b_{v,k}$ and $b_{v,n-k}$ may be correctly evaluated only after the echo canceller has converged at two different sampling positions as described above. Thus, the present invention retains very high accuracy during sampling phase adjustments even under severe communication conditions.

While the present invention has been primarily described above in the context of an echo canceller implemented as an adaptive digital filter for purposes of illustration only, those skilled in the art will appreciate that the present invention has wide application in digital communications. In fact, the present invention can be employed in any environment where a signal received over communications channel is sampled and then reconstructed. A transfer function is estimated in the frequency domain corresponding to the impulse response of that communications channel. In compensating the transfer function the frequency domain for phase adjustments to the sampling signals that occur in the time domain, aliased signal content is specifically taken into account in correcting the spectral coefficients of the transfer function. The spectral coefficients of the transfer function are analyzed as having at least two spectral components with the first component including baseband. frequency components and a second spectral component including, aliased frequency components.

In this way, information about the exact compensation with respect to the impulse response of a communications channel can be determined and implemented in the frequency domain which permits very accurate correction of its transfer function for sampling phase adjustments. Thus, the present invention can be particularly advantageous not only in accurately reconstructing signals when the Nyquist criteria may not or cannot be satisfied, e.g., when the sampling phase is adjusted, as well as in relaxing sampling rate requirements to something less than the Nyquist rate since aliased components are adequately accounted for to permit accurate reconstruction of the signal. Lower sampling rates translate directly into reduced signal processing overhead and economic cost.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a digital communications system where transceivers communicate over a communications channel, each transceiver sampling a signal received over the communications channel in accordance with a sampling signal and including an echo canceller for canceling an echo implemented as a digital filter, a method comprising the steps of:

inputting to the digital filter a signal transmitted from the transceiver and delaying the input signal through a plurality of delay stages to generate a series of input signals;

transforming the series of input signals into spectral components to create series of input spectral components;

multiplying each of the spectral components by a corresponding spectral filter coefficient to generate a corresponding product, the spectral filter coefficients representing an echo transfer function;

summing the products corresponding to each of the spectral components to generate an output signal from the digital filter corresponding to an expected echo;

subtracting the filter output signal from the received signal to cancel echo from the received signal;

determining an error based on an uncancelled echo;

adapting the spectral filter coefficients of the adaptive filter to minimize the error;

detecting that the phase of the sampling signal will be adjusted;

predicting new values of the spectral filter coefficients in the frequency domain to compensate for the sampling signal adjustment including analyzing each spectral filter coefficient as having at least two spectral components with a first spectral component including baseband frequency components and a second spectral component including aliased frequency components;

adjusting the phase of the sampling signal; and using the predicted values of the spectral filter coefficients so that the digital filter output signal accurately models the received signal when the phase of the sampling signal is adjusted.

2. The method in claim 1, wherein the predicting step includes correcting the spectral filter coefficients in the frequency domain by an amount corresponding to the amount of time the sampling signal is adjusted.

3. The method in claim 1, further comprising:

determining the values of the first and second spectral components for each spectral filter coefficient, and using the determined values of the first and second spectral components to generate the predicted value of each spectral filter coefficient.

4. The method of claim 3, wherein the predicting step includes the step of changing in the frequency domain the first and second spectral components of each spectral filter coefficient by an amount corresponding to the amount of time the sampling signal is adjusted.

5. The method in claim 4, wherein each spectral filter coefficient is predicted using two previously obtained values of the spectral filter coefficient, calculating the first and second spectral components for each spectral filter coefficient based on the two previously obtained values, and then performing the changing step.

6. An adaptive echo canceller implemented in the frequency domain for use in a digital communications system where transceivers communicate over a communications channel, each transceiver sampling a signal received over the communications channel in accordance with a timing signal, comprising:

delay stages that receive a transmitted signal to generate a series of input signals;

a Fourier transformer that transforms the series of input signals into a frequency domain to create series of input spectral components;

a multiplier multiplying each of the spectral components by a corresponding spectral filter coefficient to generate a corresponding product;

a summer that sums the products corresponding to each of the spectral components to generate a summed signal corresponding to an expected echo;

a combiner that subtracts the summed signal from a signal received over the communications channel to cancel echo from the received signal and that generates an error based on an uncancelled echo;

a signal processor that adapts the spectral filter coefficients of the adaptive filter to minimize the error;

a compensator that analyzes each spectral filter coefficient as having at least two signal components with a first spectral component including baseband frequency components corresponding to the echo and a second spectral component including aliased frequency components, predicts new values of the spectral filter coefficients in the frequency domain corresponding to an amount of time the timing signal is to be adjusted, and provides the predicted values of the spectral filter coefficients to the one or more multipliers and the signal processor so that the summed signal accurately models an echo in a signal received by the transceiver when the timing signal is adjusted.

7. The echo canceller according to claim 6, wherein each compensator modifies the spectral filter coefficients in the frequency domain by an amount corresponding to the amount of time the timing signal is adjusted.

8. The echo canceller according to claim 6, wherein the compensator determines the values of the first and second spectral components for each spectral filter coefficient, and uses the determined values of the first and second spectral components to generate the predicted value of each spectral filter component.

9. The echo canceller according to claim 8, wherein the compensator corrects the first and second spectral components of each spectral filter coefficient in the frequency domain by an amount corresponding to the amount of time the timing signal is adjusted.

10. The echo canceller according to claim 9, wherein each spectral filter coefficient is predicted using two previously obtained values of the spectral filter coefficient, calculating the first and second spectral components for the spectral filter coefficient based on the two previous values of the spectral filter coefficient, and then performing the correction of the first and second spectral components.

11. The echo canceller according to claim 7, wherein the compensator includes:

a first filter for receiving the amount of time that the timing signal is being changed;

a memory storing a set of coefficients for correcting the spectral filter coefficients;

a selector for receiving an input from the first filter to generate an address to the memory; and a plurality of second filters, each second filter corresponding to and receiving as an input one of the spectral filter coefficients including:

a delay for delaying the input signal;

a first multiplier for multiplying the delayed input signal by one of the coefficients selected from the memory;

a second multiplier for multiplying the input signal by another of the coefficients selected from the memory; and a summer for summing the products from the first and second multipliers, the sum being the predicted spectral filter coefficient.

12. In a digital communications system where transceivers communicate over a communications channel, a method implemented in one or more of the transceivers comprising the steps of:

sampling a signal received over the communications channel in accordance with a sampling signal;

developing a transfer function corresponding to the impulse response of the communications channel; and compensating the transfer function in the frequency domain for a phase adjustment in the sampling signal that occurs in the time domain including correcting the spectral coefficients of the transfer function in the frequency domain by an amount corresponding to the adjustment in the sampling signal, wherein aliased signal content is taken into account in correcting spectral coefficients of the transfer function by identifying for spectral coefficients of the transfer function at least two spectral components, a first spectral component including baseband frequency components and a second spectral component including aliased frequency components.

13. The method in claim 12, wherein the transfer function corresponds to a Fourier transform of an echo impulse response of the communications channel.

14. The method in claim 12, the method further comprising:

determining the values of the first and second spectral components for each spectral coefficient, and using the determined values of the first and second spectral components to generate the predicted value of each spectral coefficient.

15. In a digital communications system where transceivers communicate over a communications channel, each transceiver sampling a signal received over the communications channel and sampled in accordance with a timing signal, the received signal having frequency components greater than one half of the frequency of the timing signal, and including an adaptive digital filter modeling an impulse response of the communications channel, a method of operating the adaptive digital filter including determining aliased frequency components generated as a result of the sampling frequency being less than twice as high as the highest frequency in the sampled signal in the modeling of the communications channel impulse response and modifying filter coefficients of the adaptive digital filter using the determined, aliased frequency components.

16. The method in claim 15, wherein the filter coefficients represent the communications channel model, and each filter coefficient is processed using a first vector component representing nonaliased frequency components and a second vector component representing aliased frequency components.

17. The method in claim 16, wherein at least one of the filter coefficients is adjusted taking into account both its first and second vector components.

18. The method in claim 16, wherein the adaptive digital filter is recursively adapted to model a transfer function of the communications channel, the method further comprising:

converging the adaptive digital filter a first and second time to generate first and second relationships of filter coefficients representing the communications channel impulse response at first and second times, and solving a system of two equations using the first and second relationships to determine values of the filter coefficients.

19. In a digital communications system where transceivers communicate over a communications channel, a method implemented in one of the transceivers comprising the step of:

sampling a signal received over the communications channel in accordance with a timing signal having a sampling rate that is less than twice the highest frequency component of the received signal;

identifying in the sampled signals aliased frequency components generated as a result of the timing signal having a frequency that is less than twice the highest frequency component of the received signal; and reconstructing the received signal from the signal samples using the identified aliased frequency components.

20. The method in claim 19, wherein the reconstructed signal corresponds to a transfer function in the frequency domain of the impulse response of the communications channel, the method further comprising the step of:

compensating the transfer function in the frequency domain for a phase adjustment to the timing signal that occurs in the time domain.

* * * * *